Patented Apr. 15, 1941

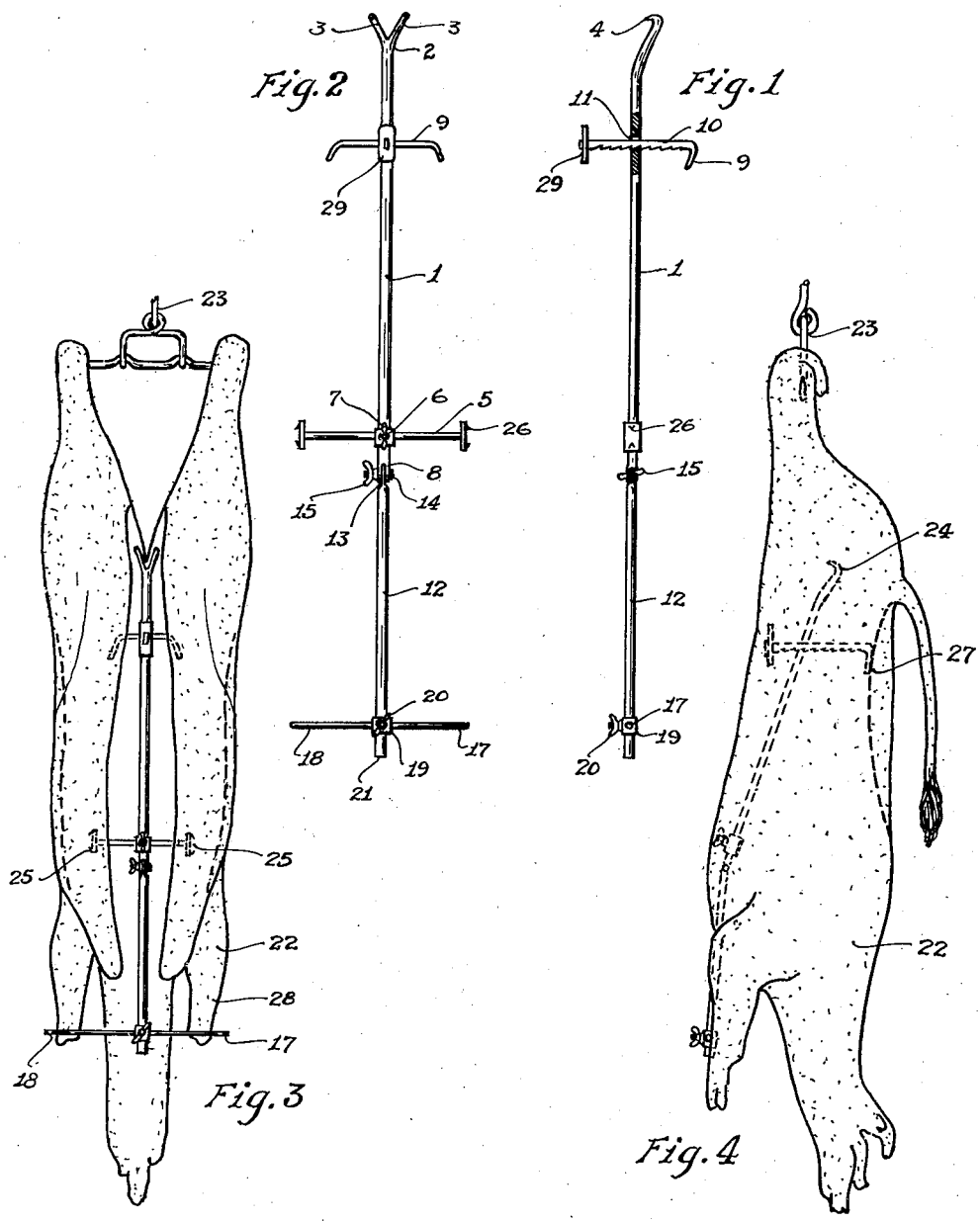

2,238,321

UNITED STATES PATENT OFFICE 2,238,321

CARCASS SPREADER

Andrew S. Hartanov, Chicago, Ill., assignor to Industrial Patents Corporation, Chicago, Ill., a corporation of Delaware Application May 25, 1939, Serial No. 275,751

4 Claims. (Cl. 17—44)

This invention relates to improvements in carcass treatment means.

One of the objects of the invention is to provide an improved carcass treatment means.

Another object of the invention is to provide an improved carcass treatment means in which the forequarter cuts of freshly chilled carcasses are given a stockier, more pleasing appearance.

Another object of the invention is to provide means for securing the foreshanks of a freshly chilled carcass inwardly relative to the carcass neck.

Other objects of the invention will be apparent from the description and claims which follow.

The present invention relates to an attachment adaptable for use with the carcass treatment means described and claimed in the application of Leonard De Moss, Serial Number 276,060, filed May 27, 1939, entitled Carcass spreader.

In the drawing, like characters of reference are used to designate similar elements.

Figure 1 illustrates a front view of the device constructed in accordance with the present invention.

Figure 2 is a side view of Figure 1.

Figure 3 is a front view of a carcass showing the manner of using the device therewith.

Figure 4 is a side view of Figure 3.

The carcass spreader described and claimed in the aforementioned application, Serial Number 276,060, comprises central rod member 1 provided at one of its ends 2 with outwardly diverging prongs 3, each of the prongs 3 being provided with upwardly turned hook 4. Laterally opposite brisket spreaders 5 are adjustably mounted through the medium of collar 6 and wing nut 7 for slidable, longitudinal movement adjacent end 8 of rod 1. Back support 9 is adjustably mounted intermediate the ends of rod 1 for movement from and toward the rod 1 through the medium of toothed bar 10 fixedly securable through opening 11.

The attachment of the present invention comprises rod 12 pivotally secured to end 8 of rod 1 within slot 13, as by bolt 14 and wing nut 15, for movement inwardly and outwardly relative to the carcass neck when the device is in position in the carcass. Laterally opposite foreshanks supports comprising laterally extending bars 17 and 18 are adjustably mounted as a unit as by collar 19, and wing nut 20 for slidable longitudinal movement adjacent the free end 21 of rod 12.

As shown in Figures 3 and 4, freshly killed carcass 22, to which the device of the present invention has been applied, is suspended from suspension means 23.

In use, rod 1 is initially secured as by prongs 3 and hooks 4 immediately beneath the aitchbone 24. Laterally opposite brisket spreaders 5 then are adjusted longitudinally of rod 1 and are firmly secured with respect to their respective briskets, as at 25, by flesh engaging points 26. Back support 9 then is suitably pressed against the backbone of the carcass, as at 27, and is fixedly adjusted as by toothed bar 10 within opening 11.

Thereafter, foreshanks 28 are suitably pressed inwardly relative to the carcass neck by laterally opposite supports 17 and 18 and are firmly fixed in position by fixed adjustment of rod 12 at pivot joint 8.

Handle 29 is provided to facilitate manual adjustment of ratchet bar 10 through opening 11 to press member 9 against the backbone.

The freshly killed carcass with the device in, then is removed to a chilling chamber following which the distended backbone and briskets and the retracted foreshanks remain firmly in placed position.

I claim:

1. In combination with a carcass spreader comprising a central rod adapted to be firmly affixed at one end against the aitchbone of the carcass and intermediate its ends between the briskets of the carcass, laterally opposite supporting members affixed to said rod for supporting the carcass foreshanks inwardly relative to the carcass neck.

2. In combination with a carcass spreader comprising a central rod adapted to be firmly affixed at one end against the aitchbone of the carcass and adjacent its opposite end between the briskets of the carcass, a second rod extended from the free end of the first rod and laterally opposite supporting members fixedly secured to the second rod for supporting the carcass foreshanks inwardly relative to the carcass neck.

3. In combination with a carcass spreader comprising a central rod adapted to be firmly affixed at one end against the aitchbone of the carcass and adjacent its opposite end between the briskets of the carcass, a second rod pivotally secured in longitudinal alignment with the first rod and at the free end of the first rod, means for fixedly securing the second rod relative to the first rod and laterally opposite supporting members fixedly secured to the second rod for supporting the carcass foreshanks inwardly relative to the carcass neck.

4. In combination with a carcass spreader comprising a central rod adapted to be firmly affixed at one end against the aitchbone of the carcass and adjacent its opposite end against the briskets of the carcass, a second rod pivotally secured in longitudinal alignment with the first rod and at the free end of the first rod, means for fixedly securing the second rod relative to the first rod and laterally opposite supporting members adjustably mounted on the second rod for movement longitudinally of the second rod and for supporting the carcass foreshanks inwardly relative to the carcass neck.

ANDREW S. HARTANOV.